(12) United States Patent
Kim et al.

(10) Patent No.: US 8,739,628 B2
(45) Date of Patent: Jun. 3, 2014

(54) INERTIAL SENSOR

(75) Inventors: Jong Woon Kim, Seoul (KR); Liwei Lin, San Ramon, CA (US); Minyao Mao, Santa Rosa, CA (US); Heung Woo Park, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 379 days.

(21) Appl. No.: 13/165,436

(22) Filed: Jun. 21, 2011

(65) Prior Publication Data

US 2012/0152020 A1 Jun. 21, 2012

(30) Foreign Application Priority Data

Dec. 15, 2010 (KR) .......................... 10-2010-0128538

(51) Int. Cl.
*G01P 15/08* (2006.01)

(52) U.S. Cl.
USPC ..................................................... 73/514.38

(58) Field of Classification Search
USPC ................ 73/514.32, 514.33, 514.34, 514.38
See application file for complete search history.

(56) References Cited

U.S. PATENT DOCUMENTS 5,351,542 A * 10/1994 Ichimura et al. ........... 73/514.33
7,389,691 B2 * 6/2008 Kai ............................. 73/514.36

* cited by examiner

*Primary Examiner* — John Chapman, Jr.
(74) *Attorney, Agent, or Firm* — Ladas & Parry, LLP

(57) ABSTRACT

An inertial sensor includes a plate-like substrate layer, a mass body, a support frame, a limit stop extending in the central direction of the mass body from the support frame, and a detection unit detecting the displacement of the displacement part. The inertial sensor adopts the limit stop limiting the downward displacement of the mass body to prevent the support portion of the mass body from being damaged.

20 Claims, 8 Drawing Sheets

INERTIAL SENSOR

CROSS REFERENCE TO RELATED APPLICATION

This application claims the benefit of Korean Patent Application No. 10-2010-0128538, filed on Dec. 15, 2010, entitled "Inertial Sensor", which is hereby incorporated by reference in its entirety into this application.

BACKGROUND OF THE INVENTION

1. Technical Field

The present invention relates to an inertial sensor.

2. Description of the Related Art

Recently, an inertial sensor has been used as various applications, for example, militaries such as an artificial satellite, a missile, an unmanned aerial vehicle, or the like, vehicles such as an air bag, an electronic stability control (ESC), a black box for a vehicle, or the like, a hand-shaking preventing device for a camcorder, a motion sensing device of a mobile phone, a game machine, a navigation, etc.

The inertial sensor generally uses a configuration of bonding a mass body to a flexible substrate such as a diaphragm, etc., in order to measure acceleration and angular velocity. Through the configuration, the inertial sensor may yield the acceleration by measuring an inertia force applied to the mass body and yield the angular velocity by measuring a Coriolis force applied to the mass body.

However, when the excessive force is applied to the mass body, a support portion of the mass body may be damaged. In particular, when the inertial sensor collides with a ground by the free fall thereof, a very large force is applied to the mass body and thus, it is highly likely to damage the support portion of the mass body. Therefore, there is a need to include a physical structure in order to limit the displacement of the mass body in a predetermined range. However, in order to limit the downward displacement of the mass body, the inertial sensor according to the prior art includes a lower substrate and the lower substrate should be provided with a separate convex portion corresponding to the downward displacement of the mass body. Therefore, the manufacturing process of the inertial sensor is complicated and it is difficult to precisely control the thickness of the convex part corresponding to the downward displacement, thereby degrading the mass body production of the inertial sensor.

SUMMARY OF THE INVENTION

The present invention has been made in an effort to provide an inertial sensor capable of preventing a support portion of a mass body from being damaged by adopting a support part limiting a downward displacement of a mass body.

According to a preferred embodiment of the present invention, there is provided an inertial sensor, including: a plate-like substrate layer including a displacement part provided at a central part thereof, a fixing part provided at the outside of the displacement part, and an elastic part connecting the displacement part to the fixing part so that the displacement part is displaceable with respect to the fixing part; a mass body provided at the bottom portion of the displacement part; a post provided at the bottom portion of the fixing part to support the substrate layer and surrounding the mass body; a support part extending in the central direction of the mass body from the post to correspond to the elastic part and disposed to be spaced by a predetermined gap from the bottom surface of the elastic part, and a detection unit detecting the displacement of the displacement part.

The inertial sensor may further include a mass body adhesive layer bonding the displacement part to the mass body; and a post adhesive layer bonding the fixing part to the post.

The substrate layer may be provided with four slits having a polygonal shape of which one apex is opened and one apex of each slit is disposed toward the center of the substrate layer, the displacement part includes a central part provided on the center of the substrate layer toward one apex and four outside parts surrounded by each slit, the elastic part is provided between the pair of slits adjacent to each other; and the fixing part is provided at the edge portion of the substrate layer that is the outsides of four slits.

The mass body may include: a central portion provided on the bottom portion of the central part to correspond to the central part; and four wing portions extending from the central portion to correspond to the four outside parts.

Each wing portion may extend further outwardly than the outside part and the top surface of the wing portion overlaps with the bottom surface of the fixing part.

The support part may be formed in four along between the pair of wing portions adjacent to each other and extends immediately before the central portion from the post.

Four slits may be each disposed on the quartered substrate layer in the same shape to be symmetrical with each other.

When a force exceeding a tolerance is applied to the mass body downwardly, a predetermined gap may be set between the support part and the bottom surface of the elastic part so that the support part limits the downward displacement of the displacement part.

The post and the support part may be simultaneously formed by etching a silicon substrate.

The height of the post may be the same as that of the support part.

The detection unit may be a piezoelectric element or a piezoresistive element disposed on the elastic part.

According to another preferred embodiment of the present invention, there is provided an inertial sensor, including: a plate-like substrate layer, a mass body provided at the bottom portion of the central part of the substrate layer; a post provided on the bottom portion of the edge of the substrate layer to support the substrate layer and surrounding the mass body; a support part extending in the central direction of the mass body from the post and disposed to be spaced by a predetermined gap from the bottom surface of the substrate layer; and a detection unit detecting the displacement of the central part of the substrate layer.

The inertial sensor may further include: a mass body adhesive layer bonding the bottom portion of the central part of the substrate layer to the mass body; and a post adhesive layer bonding the bottom portion of the edge of the substrate layer to the post.

The mass body may be formed in a cylindrical shape.

The post may be formed in a rectangular pillar shape having a cylindrical cavity formed at the center thereof.

The support part may be formed in two or more at equidistance along the inner side of the post and may extend immediately before the mass body from the post.

When a force exceeding tolerance is applied to the mass body downwardly, a predetermined gap may be set between the support part and the bottom surface of the substrate layer so that the support part limits the downward displacement of the substrate layer.

The post and the support part may be simultaneously formed by etching a silicon substrate.

The height of the post may be the same as that of the support part.

The detection unit may be a piezoelectric element or a capacitance element disposed on the top portion of the substrate layer.

DESCRIPTION OF THE PREFERRED EMBODIMENTS

Figure 1:
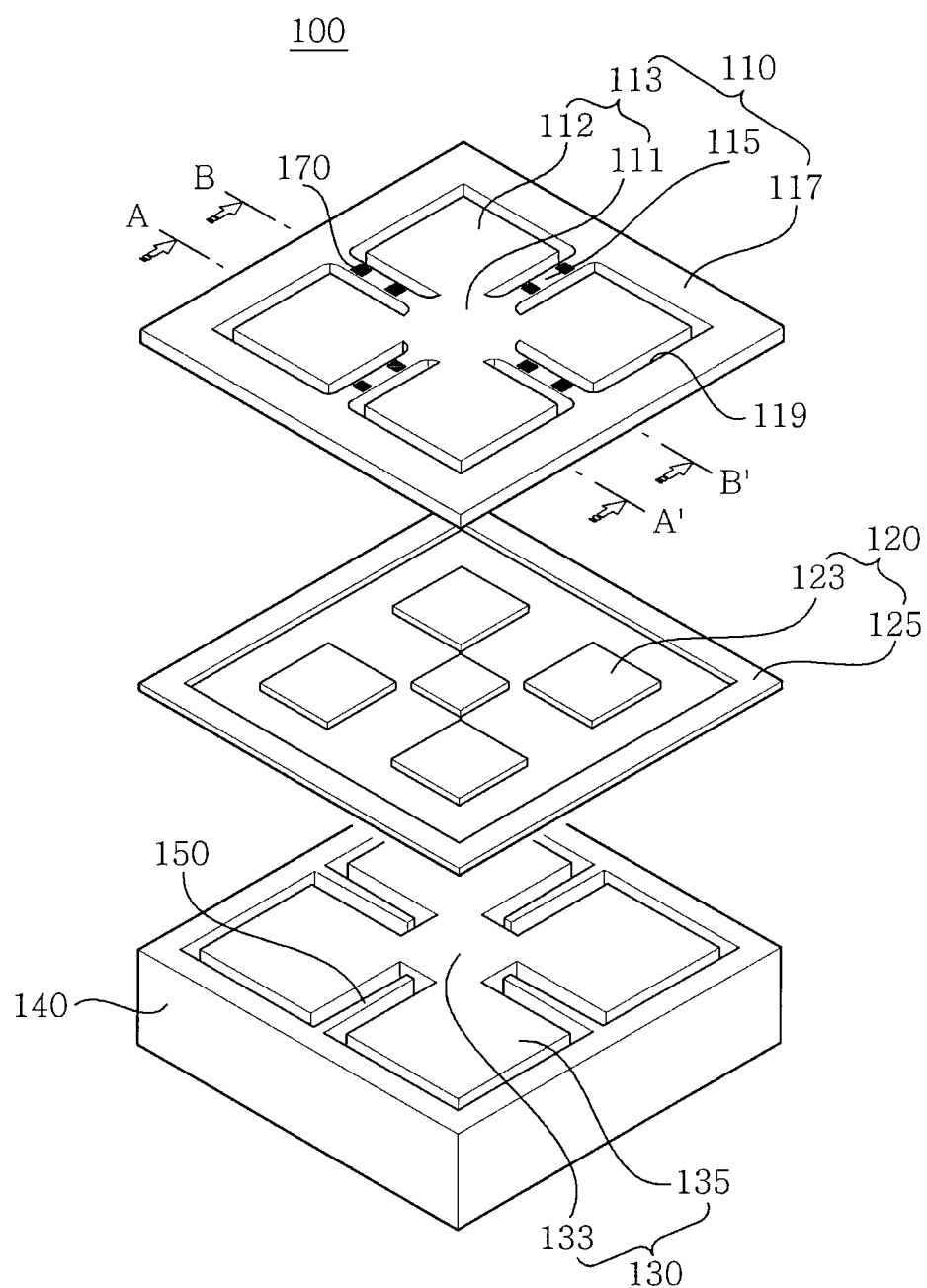
FIG. 1 is an exploded perspective view of an inertial sensor according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the subject of the present invention.

Hereinafter, preferred embodiments of the present invention will be described in detail with reference to the accompanying drawings.

Inertial Sensor According to First Preferred Embodiment

Figure 2:
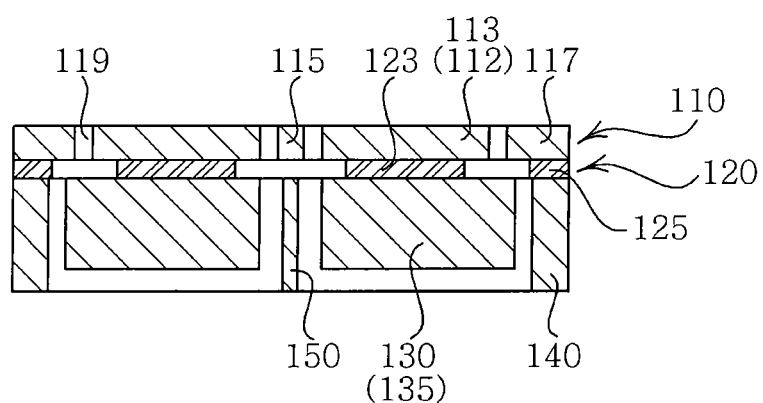
FIG. 2 is a cross-sectional view taken along line A-A' of the inertial sensor shown in FIG. 1.
Figure 3:
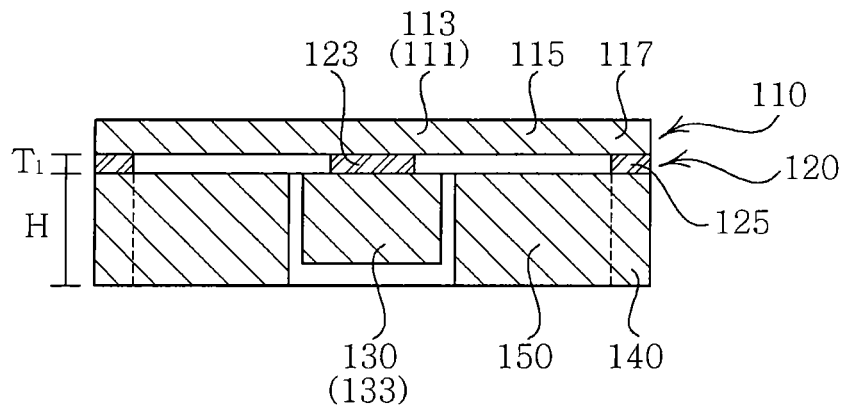
FIG. 3 is a cross-sectional view taken along line B-B' of the inertial sensor shown in FIG. 1.
Figure 4:
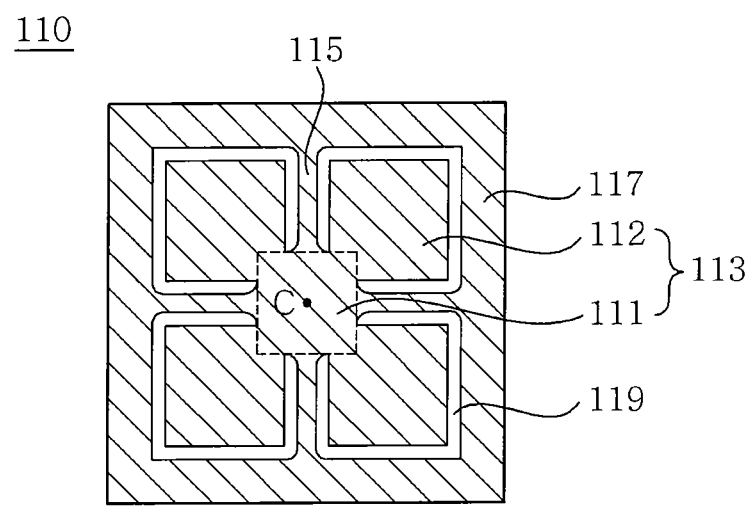
FIG. 4 is a plan view of a substrate layer shown in FIG. 1.
Figure 5:
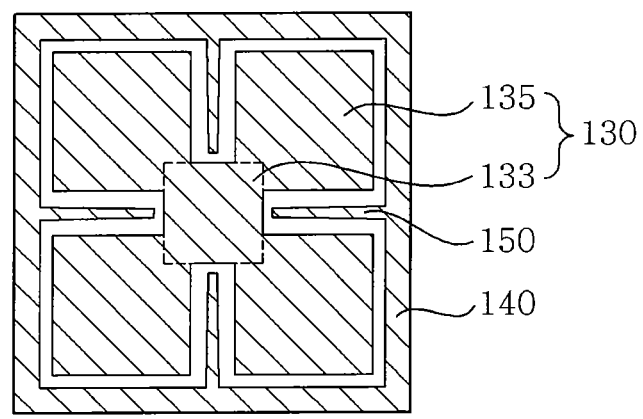
FIG. 5 is a plan view of a mass body, a post, and a support part shown in FIG. 1.
Figure 6:
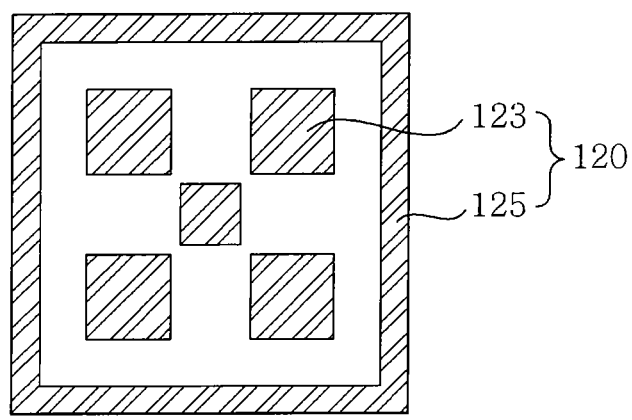
FIG. 6 is a plan view of an adhesive layer shown in FIG. 1.

FIG. 1 is an exploded perspective view of an inertial sensor according to a first preferred embodiment of the present invention, FIG. 2 is a cross-sectional view taken along line A-A' of the inertial sensor shown in FIG. 1, FIG. 3 is a cross-sectional view taken along line B-B' of the inertial sensor shown in FIG. 1, FIG. 4 is a plan view of a substrate layer shown in FIG. 1, and FIG. 5 is a plan view of a mass body, a post, and a support part shown in FIG. 1, and FIG. 6 is a plan view of a adhesive layer shown in FIG. 1.

Referring to FIGS. 1 to 3, an inertial sensor 100 according to the preferred embodiment of the present invention is configured to include a plate-like substrate layer 110 including a displacement part 113 provided at a central part thereof, a fixing part 117 provided at the outer side of the displacement part 113, and an elastic part 115 connecting the displacement part 113 to the fixing part 117 so that the displacement part 113 is displaceable with respect to the fixing part 117, a mass body 130 provided at the bottom portion of the displacement part 113, a support frame 140 provided at the bottom portion of the fixing part 117 to support the substrate layer 110 and surrounding the mass body 130, a limit stop 150 extending in the central direction of the mass body 130 from the support frame 140 to correspond to the elastic part 115 and disposed to be spaced by a predetermined gap T1 from the bottom surface of the elastic part 115, and a detection unit 170 detecting the displacement of the displacement part 113.

The substrate layer 110 is partitioned into the displacement part 113, the fixing part 117, and the elastic part 115 based on a slit 119 and is disposed on the uppermost layer of the inertial sensor 100. Reviewing in detail the substrate layer 110 with reference to FIG. 4, four slits 119 are formed to have a polygonal shape of which one apex is opened and the opened one apex of each slit 119 is disposed toward the center C of the substrate layer 110. In this case, four slits 119 are each formed of the substrate layer 110 that is quartered to have the same shape and are disposed to be symmetrical with each other based on the center C of the substrate layer 110. In addition, if the slit 119 has a polygonal shape, the shape thereof is not specifically limited, but may be formed as a quadrangular shape as shown. The substrate layer 110 is partitioned into the displacement part 113, the fixing part 117, and the elastic part 115 based on four slits 119. In this configuration, the displacement part 113 is provided at the central part of the substrate layer 110 and has the mass body 130 bonded to the bottom portion thereof (see FIGS. 2 and 3), thereby generating the displacement corresponding to the motion of the mass body 130. In this configuration, the displacement part 113 is configured to include a central part 111 provided at the center C of the substrate layer 110 and four outside parts 112 surrounded by each slit 119 (see FIG. 4). In addition, the fixing part 117 has the support frame 140 bonded to the bottom portion thereof to support the displacement part 113 (see FIGS. 2 and 3) and is provided at the outside of the displacement part 113. In more detail, the fixing part 117 is provided at the edge portions of the substrate layer 110 that are the outsides of four slits 119 (see FIG. 4). Meanwhile, the elastic part 115 connects the displacement part 113 to the fixing part 117 so that the displacement part 113 is displaceable with respect to the fixing part 117, thereby being elastically deformed according to the motion of the mass body 130. In this case, the elastic part 115 is provided between a pair of slits 119 adjacent to each other, such that four elastic parts 115 connect the central part 111 and the fixing part 117 in a cross form (see FIG. 4).

The mass body 130 is displaced by the inertial force or the Coriolis force and is provided on the bottom portion of the displacement part 113. Describing in detail the mass body 130 with reference to FIG. 5, the mass body 130 is configured to include a central portion 133 provided on the bottom portion of the central part 111 to correspond to the central part 111 of the substrate layer 110 and a wing portion 135 extending to correspond to four outside parts 112 of the substrate layer 110 from the central portion 133. That is, the mass body 130 includes the central portion 133 and four wing portions 135 that are integrally formed, wherein four wing portions 135 is formed in a fan shape surrounding the central portion 133. Meanwhile, each wing portion 135 extends further outwardly than each of the outside parts 112 of the substrate layer 110 to overlap the top surface of the wing portion 135 with the bottom surface of the fixing part 117 by a predetermined portion 160, such that the upward displacement of the mass body 130 is limited (see FIG. 7) and the detailed description thereof will be described below.

The support frame 140 is formed in a hollow shape to support the substrate layer 110 to secure a space in the mass body 130 is displaced and is provided on the bottom portion of the fixing part 117 of the substrate layer 110 (see FIGS. 1 and 2). In this configuration, the support frame 140 has a transverse section formed in a quadrangular shape to surround the mass body 130 and may be formed simultaneously with the limit stop 150 by etching the silicon substrate (see FIG. 5).

The limit stop 150 serves to limit the downward displacement of the mass body 130 and is protruded in the central direction of the mass body 130 from the support frame 140 to correspond to the elastic part 115 of the substrate layer 110 (see FIG. 1). The limit stop 150 is provided with four transverse sections in a pin shape along between a pair of wing portions 135 adjacent to each other extends immediately before the central portion 133 of the mass body 130 from the support frame 140 (see FIG. 5). In addition, as show in FIG. 3, the limit stop 150 is disposed to be spaced by a predetermine interval $T_1$ from the bottom surface of the elastic part 115. The predetermined gap $T_1$ is a reference limiting the downward displacement of the mass body 130 and the detailed description thereof will be described below. Meanwhile, when the inertial sensor 100 is manufactured by using a silicon on insulator (SOI) substrate, the limit stop 150 may be simultaneously formed by changing only the etching resist pattern when the support frame 140 is formed by etching the silicon substrate. Therefore, the limit stop 150 may be formed without performing the complex additional process. In addition, when the limit stop 150 and the support frame 140 are simultaneously formed through the process, the height H (see FIG. 3) of the limit stop 150 and the support frame 140 is formed to be the same.

Meanwhile, the mass body 130 is bonded to the displacement part 113 of the substrate layer 110 and the support frame 140 is bonded to the fixing part 117 of the substrate layer 110 (see FIGS. 2 and 3), such that there is a need for the adhesive layer 120 between the mass body 130 and the displacement part 113 and between the support frame 140 and the fixing part 117. Reviewing in detail the adhesive layer 120 with reference to FIG. 6, the adhesive layer 120 is configured to include a mass body adhesive layer 123 bonding the displacement part 113 to the mass body 130 and a post adhesive layer 125 bonding the fixing part 117 to the support frame 140. In this configuration, five mass body adhesive layers 123 are formed to correspond to the central part 111 and four outside parts 112 of the substrate layer 110, respectively, wherein each area may be smaller than the area of the central part 111 and the outside part 112 of the substrate layer 110.

The detection unit 170 (see FIG. 1) measures the elastic deformation of the elastic part 115 to detect the displacement of the displacement part 113 and is disposed on one surface of the elastic part 115. In this configuration, the detection unit 170 may be a piezoelectric element or a piezoresistive element. The piezoelectric element may detect the displacement of the displacement part 113 by using the polarization property and the piezoresistive element may detect the displacement of the displacement part 113 by using the change in resistance. However, when the detection unit 170 is a piezoelectric element, it may detect the displacement of the displacement part 113 by using the polarization characteristics and may vibrate the mass body 130 at a predetermined frequency in order to measure the angular velocity.

Figure 7:
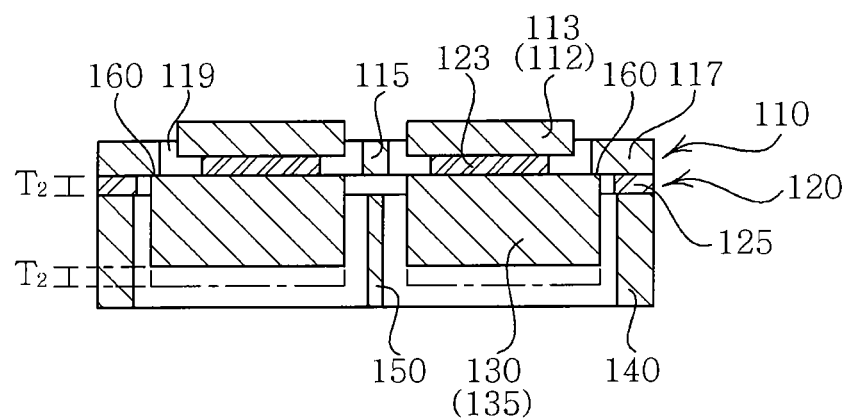
FIG. 7 is a cross-sectional view showing a process of limiting an upward displacement of the inertial sensor shown in FIG. 2.
Figure 8:
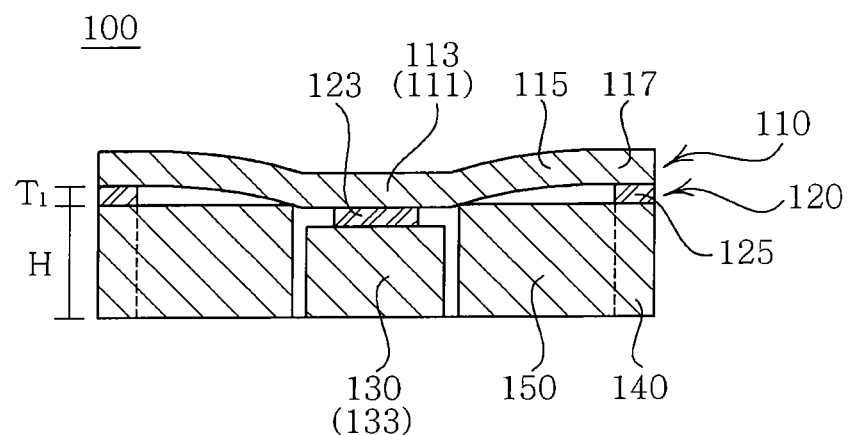
FIG. 8 is a cross-sectional view showing a process of limiting a downward displacement of the inertial sensor shown in FIG. 3.
Figure 9:
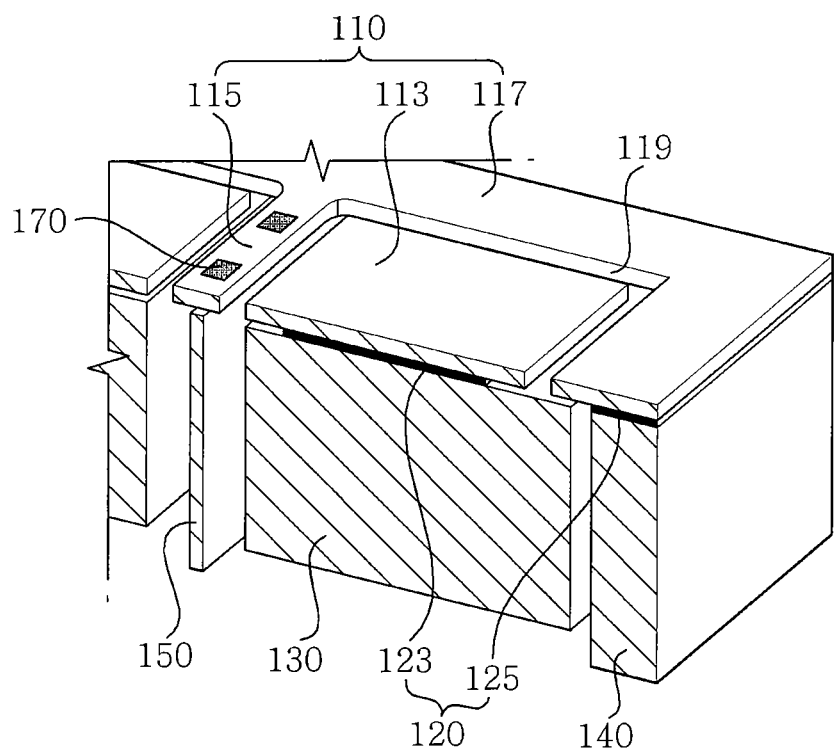
FIG. 9 is a partial coupling perspective view of the inertial sensor shown in FIG. 1.

FIG. 7 is a cross-sectional view showing a process of limiting an upward displacement of the inertial sensor shown in FIG. 2 and FIG. 8 is a cross-sectional view showing a process of limiting a downward displacement of the inertial sensor shown in FIG. 3. FIG. 9 is a partial coupling perspective view of the inertial sensor shown in FIG. 1.

Hereinafter, the operation process of the inertial sensor will be described with reference to FIGS. 7 to 9.

As shown in FIG. 7, the wing portion 135 of the mass body 130 extends further outwardly than the outside part 112 of the displacement part 113, such that a predetermined portion 160 of the top surface of the wing portion 135 and the bottom surface of the fixing part 117 overlaps. Therefore, even though an excessive force exceeding a tolerance is applied to the mass body 130 upwardly, the upward displacement of the mass body 130 is limited to the thickness T2 of the adhesive layer 120. Since the upward displacement of the mass body 130 is limited, it is possible to prevent the elastic part 115 elastically deformed according to the motion of the mass body 130 from being out of the elastic limit. Meanwhile, when the inertial sensor 100 is manufactured using an SOI substrate, the adhesive layer 120 is formed by using an intermediate layer of the SOI substrate, a silicon oxide layer, such that it can implement the thickness of a uniform and precision dimension. The thickness T2 of the adhesive layer 120 may be precisely implemented, such that an inertial sensor 100 can be precisely limited the upward displacement of the mass body 130.

As shown in FIGS. 8 and 9, the limit stop 150 extends from the support frame 140 to correspond to the elastic part 115 and is formed to be spaced by a predetermined gap $T_1$ from the bottom surface of the elastic part 115, thereby limiting the downward displacement of the elastic part 115. Therefore, even though the excessive force exceeding the tolerance is applied to the mass body 130 downwardly, the downward displacement of the mass body 130 is limited to a predetermined gap $T_1$ between the limit stop 150 and the elastic part 115. Meanwhile, the height H of the limit stop 150 and the support frame 140 is the same and thus, the top surface of the limit stop 150 and the top surface of the support frame 140 are disposed on a co-plane, such that the predetermined gap $T_1$ between the limit stop 150 and the elastic part 115 is the same as the thickness of the adhesive layer 120. In this case, the thickness of the adhesive layer 120 may be precisely implemented by using the silicon oxide layer as described above, such that the downward displacement of the mass body 130 may also be precisely limited likewise the upward displacement thereof The inertial sensor 100 according to the preferred embodiment of the present invention uses the limit stop 150 to limit the downward displacement of the mass body 130, such that it is possible to prevent the elastic part 115 elastically deformed according to the motion of the mass body 130 from being damaged by being out of the elastic limit. In addition, since the limit stop 150 is formed within the space surrounded by the support frame 140, it is possible to limit the downward displacement of the mass body 130 without increasing the entire volume of the inertial sensor 100.

Inertial Sensor According to Second Preferred Embodiment

Figure 10:
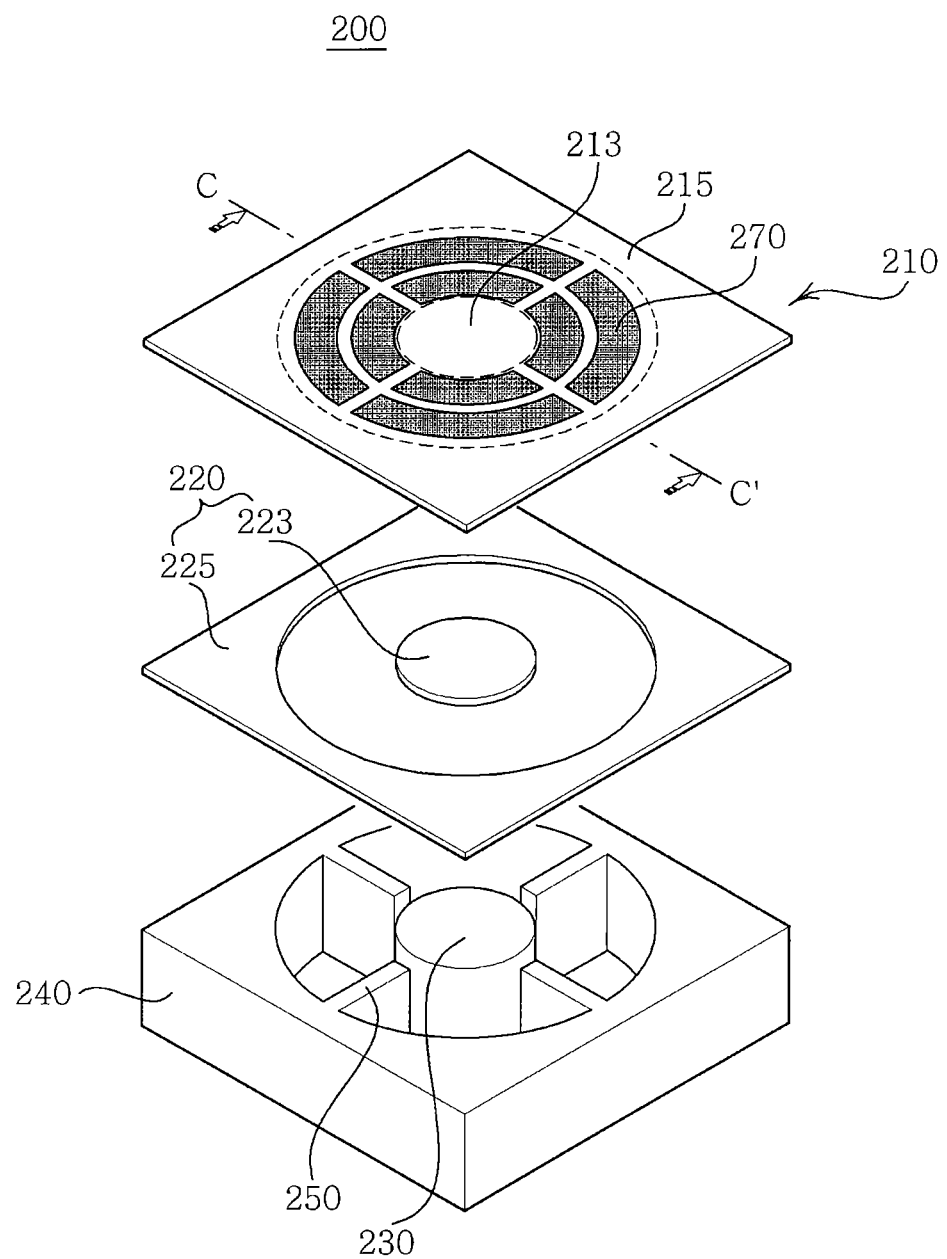
FIG. 10 is an exploded perspective view of an inertial sensor according to a second preferred embodiment of the present invention.
Figure 11:
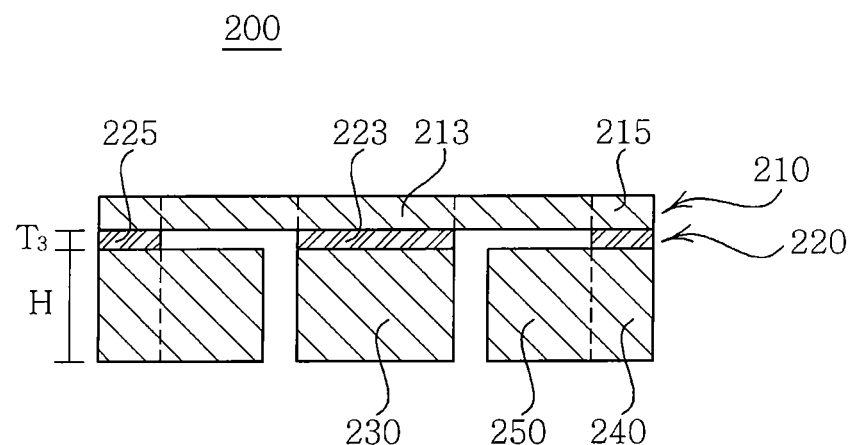
FIG. 11 is a cross-sectional view taken along line C-C' of the inertial sensor shown in FIG. 10.
Figure 12:
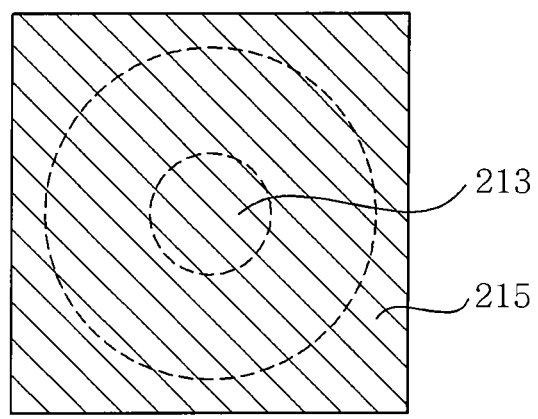
FIG. 12 is a plan view of a substrate layer shown in FIG. 10.
Figure 13:
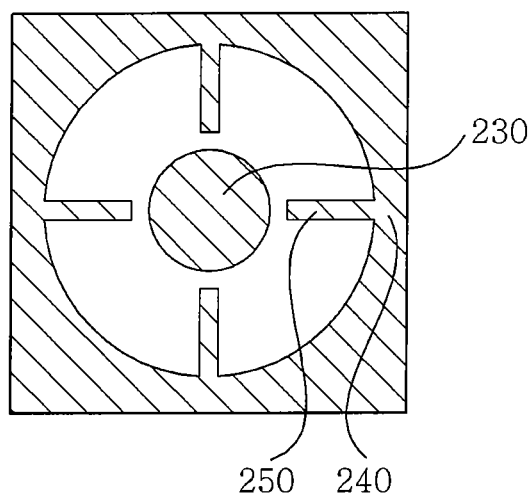
FIG. 13 is a plan view of a mass body, a post, and a support part shown in FIG. 10.
Figure 14:
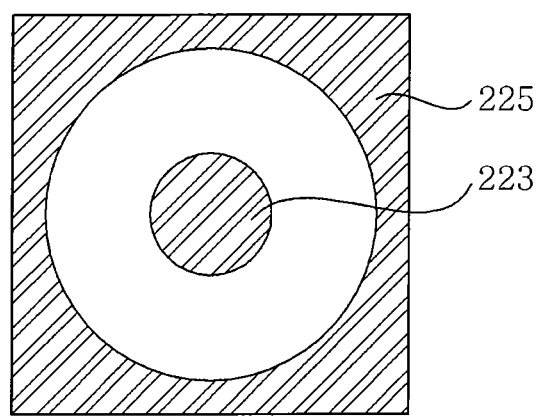
FIG. 14 is a plan view of the adhesive layer shown in FIG. 10.

FIG. 10 is an exploded perspective view of an inertial sensor according to a second preferred embodiment of the present invention, FIG. 11 is a cross-sectional view taken along line C-C' of the inertial sensor shown in FIG. 10, FIG. 12 is a plan view of a substrate layer shown in FIG. 10, FIG. 13 is a plan view of a mass body, a post, and a support part shown in FIG. 10, and FIG. 14 is a plan view of the adhesive layer shown in FIG. 10.

As shown in FIGS. 10 and 11, an inertial sensor 200 according to the present invention is configured to include a plate-like substrate layer 210, a mass body 230 provided on the bottom portion of the central part 213 of the substrate layer 201, a post 240 provided on the bottom portion of the edge 215 of the substrate layer 210 to support the substrate layer 210 and surrounding the mass body 230, a support part 250 extending in the central direction of the mass body 230 from the post 240 and disposed to be spaced by a predetermined gap $T_3$ from the bottom surface of the substrate layer 210, and the detection unit 270 detecting the displacement of the central part 213 of the substrate layer 210.

The largest difference between the inertial sensor 100 according to the first exemplary embodiment and the inertial sensor 200 according to the preferred embodiment is whether the slit 119 (see FIG. 1) is formed on the substrate layer 210, the shape of the mass body 230, or the like. Therefore, the present preferred embodiment mainly describes the above-mentioned difference and the repeated description thereof will be omitted.

The substrate layer 210 is not provided with the slit unlike the above-mentioned preferred embodiment but formed in an integrated plate shape and is disposed on the uppermost layer of the inertial sensor 200. Reviewing in detail the substrate layer 210 with reference to FIG. 12, the boundary of the substrate layer 210 is not specifically discriminated, but the substrate layer 210 may be partitioned into the edge 215 where the central part 213 having the mass body 230 provided at the bottom portion thereof and having the post 240 provided at the bottom portion thereof are provided. Consequently, the bottom portion of the central part 213 of the substrate layer 210 is bonded to the mass body 230 (see FIG. 11), such that the displacement corresponding to the motion of the mass body 230 occurs. In addition, the bottom portion of the edge 215 of the substrate layer 210 is bonded to the post 240 to support the central part 213 of the substrate layer 210 (see FIG. 11). Meanwhile, between the central part 213 of the substrate layer 210 and the edge 215 of the substrate layer 210 is elastically deformed according to the motion of the mass body 230.

The mass body 230 is displaced by the inertial force or the Coriolis force and is provided on the bottom portion of the central part 213 of the substrate layer 210 (see FIG. 11). In addition, the post 240 is formed in a hollow shape to support the substrate layer 210 to secure a space in which the mass body 230 is displaced and is provided on the bottom portion of the edge 215 of the substrate layer 210 (see FIG. 11). Reviewing in detail the mass body 230 and the post 240 with reference to FIG. 13, the mass body 230 may be, for example, formed in a cylindrical shape and the center of the post 240 may be formed in a rectangular pillar shape in which a cavity having a cylindrical shape is formed. That is, when being viewed from the transverse section, the mass body 230 is formed in a circular shape and the post 240 surrounds the mass body 230 in a circular shape.

The support part 250 serves to limit the downward displacement of the mass body 230 and is protruded in the central direction of the mass body 230 from the post 240 (see FIG. 10). In this case, four support parts 250 are formed in a pin shape at an interval of 90° along the inner side of the post 240 and extends to immediately before the mass body 230 from the post 240 (see FIG. 13). However, the support part 250 is not necessarily provided in four, but may be formed in two or more at equidistance according to the inner side of the post 240. That is, the support part 250 may be formed in two at an interval of 180° along the inner side of the post 240 and may be formed in three at an interval of 120°. As shown in FIG. 11, the support part 250 is disposed to be spaced by a predetermined gap $T_3$ from the substrate layer 210. The predetermined gap $T_3$ limits the downward displacement of the mass body 230, similar to the inertial sensor 100 according to the first preferred embodiment. That is, even though the excessive force exceeding the tolerance is applied to the mass body 230 downwardly, the downward displacement of the mass body 230 is limited to a predetermined gap $T_3$ between the support part 250 and the elastic part 210. Meanwhile, when the inertial sensor 200 is manufactured by using the silicon on insulator (SOI) substrate, it may be formed simultaneously with the support part 250 by changing only the etching resist pattern in the case where the post 240 is formed by etching the silicon substrate. In this case, the height H (see FIG. 11) of the support part 250 and the mass body 230 is formed to be same.

Meanwhile, the mass body 230 is bonded to the central part 213 of the substrate layer 210 and the post 240 is bonded to the edge 215 of the substrate layer 210 (see FIG. 11), such that the adhesive layer 220 is needed between the mass body 230 and the central part 213 of the substrate layer 210 and between the post 240 and the edge 215 of the substrate layer 210. Referring in detail the adhesive layer 220 with reference to FIG. 14, the adhesive layer 220 is configured to include a mass body adhesive layer 223 bonding the central part 213 of the substrate layer 210 and the mass body 230 and a post adhesive layer 225 bonding the edge 215 of the substrate layer 210 to the post 240. In this case, the mass body adhesive layer 223 and the post adhesive layer 225 may be formed in a shape corresponding to each of the mass body 230 and the post 240. Further, as described above, the height H of the support part 250 and the post 240 is the same and thus, the top surface of the support part 250 and the top surface of the post 240 are disposed on a co-plane, such that the predetermined gap $T_3$ between the support part 250 and the substrate layer 210 is the same as the thickness of the adhesive layer 220. Consequently, the downward displacement of the mass body 230 may be precisely limited by controlling the thickness of the adhesive layer 220.

The detection unit 270 (see FIG. 10) measures the elastic deformation between the central part 213 and the edge 215 of the substrate layer 210 to measure the displacement of the central part 213 of the substrate layer 210 and is disposed on the top portion of the substrate layer 210. In this case, the detection unit 270 may be a piezoelectric element or a capacitance element. The piezoelectric element can detect the displacement of the central part 213 of the substrate layer 210 by using the polarization characteristics and the capacitance element can detect the displacement of the central part 213 of the substrate layer 210 by using the change in capacitance. However, the detection unit 270 can detect the displacement of the central part 213 of the substrate layer 210 and vibrate the mass body 230 at a predetermined frequency in order to measure the angular velocity.

As set forth above, the present invention can prevent the support part the mass body from being damaged by adopting the support part limiting the downward displacement of the mass body.

In addition, the preferred embodiment of the present invention forms the post and the support part by etching the single silicon substrate, thereby making it possible to provide the support part by changing only the etching resist pattern.

Further, the preferred embodiment of the present invention limits the displacement of the mass body by using the thickness of the adhesive layer capable of implementing the precision dimensions, thereby making it possible to precisely limit the maximum displacement of the mass body.

Although the embodiments of the present invention has been disclosed for illustrative purposes, it will be appreciated that the inertial sensor according to the invention is not limited thereby, and those skilled in the art will appreciate that various modifications, additions and substitutions are possible, without departing from the scope and spirit of the invention. Accordingly, any and all modifications, variations or equivalent arrangements should be considered to be within the scope of the invention, and the detailed scope of the invention will be disclosed by the accompanying claims.

What is claimed is:

1. An inertial sensor, comprising:
    a plate-like substrate layer including a displacement part provided at a central part thereof, a fixing part provided at the outside of the displacement part, and an elastic part connecting the displacement part to the fixing part so that the displacement part is displaceable with respect to the fixing part;
    a mass body provided at the bottom portion of the displacement part;
    a support frame provided at the bottom portion of the fixing part to support the substrate layer and surrounding the mass body;
    a limit stop extending in the central direction of the mass body from the support frame to correspond to the elastic part and disposed to be spaced by a predetermined gap from the bottom surface of the elastic part, and a detection unit detecting the displacement of the displacement part.

2. The inertial sensor as set forth in claim 1, further comprising:
    a mass body adhesive layer bonding the displacement part to the mass body; and
    a support frame adhesive layer bonding the fixing part to the support frame.

3. The inertial sensor as set forth in claim 1, wherein the substrate layer is provided with four slits having a polygonal shape of which one apex is opened and one apex of each slit is disposed toward the center of the substrate layer, the displacement part includes a central part provided on the center of the substrate layer toward one apex and four outside parts surrounded by each slit, the elastic part is provided between the pair of slits adjacent to each other, and the fixing part is provided at the edge portion of the substrate layer that is the outsides of four slits.

4. The inertial sensor as set forth in claim 3, wherein the mass body includes:
    a central portion provided on the bottom portion of the central part to correspond to the central part; and
    four wing portions extending from the central portion to correspond to the four outside parts.

5. The inertial sensor as set forth in claim 4, wherein each wing portion extends further outwardly than the outside part and the top surface of the wing portion overlaps with the bottom surface of the fixing part.

6. The inertial sensor as set forth in claim 4, wherein the limit stop is formed in four along between the pair of wing portions adjacent to each other and extends immediately before the central portion from the support frame.

7. The inertial sensor as set forth in claim 3, wherein four slits are each disposed on the quartered substrate layer in the same shape to be symmetrical with each other.

8. The inertial sensor as set forth in claim 1, wherein when a force exceeding a tolerance is applied to the mass body downwardly, a predetermined gap is set between the limit stop and the bottom surface of the elastic part so that the limit stop limits the downward displacement of the displacement part.

9. The inertial sensor as set forth in claim 1, wherein the support frame and the limit stop are simultaneously formed by etching a silicon substrate.

10. The inertial sensor as set forth in claim 1, wherein the height of the support frame is the same as that of the limit stop.

11. The inertial sensor as set forth in claim 1, wherein the detection unit is a piezoelectric element or a piezoresistive element disposed on the elastic part.

12. An inertial sensor, comprising:
    a plate-like substrate layer;
    a mass body provided at the bottom portion of the central part of the substrate layer;
    a support frame provided on the bottom portion of the edge of the substrate layer to support the substrate layer and surrounding the mass body;
    a limit stop extending in the central direction of the mass body from the support frame and disposed to be spaced by a predetermined gap from the bottom surface of the substrate layer; and
    a detection unit detecting the displacement of the central part of the substrate layer.

13. The inertial sensor of claim 12, further comprising:
    a mass body adhesive layer bonding the bottom portion of the central part of the substrate layer to the mass body; and
    a support frame adhesive layer bonding the bottom portion of the edge of the substrate layer to the support frame.

14. The inertial sensor of claim 12, wherein the mass body is formed in a cylindrical shape.

15. The inertial sensor of claim 12, wherein the support frame is formed in a rectangular pillar shape having a cylindrical cavity formed at the center thereof.

16. The inertial sensor of claim 12, wherein the limit stop is formed in two or more at an equidistance along the inner side of the support frame and extends immediately before the mass body from the support frame.

17. The inertial sensor of claim 12, wherein when a force exceeding tolerance is applied to the mass body downwardly, a predetermined gap is set between the limit stop and the bottom surface of the substrate layer so that the limit stop limits the downward displacement of the displacement part.

18. The inertial sensor of claim 12, wherein the support frame and the limit stop are simultaneously formed by etching a silicon substrate.

19. The inertial sensor of claim 12, wherein the height of the support frame is the same as that of the limit stop.

20. The inertial sensor of claim 12, wherein the detection unit is a piezoelectric element or a capacitance element disposed on the top portion of the substrate layer.

* * * * *